United States Patent [19]
Marlowe

[11] Patent Number: 5,475,723
[45] Date of Patent: Dec. 12, 1995

[54] NUCLEAR FUEL CLADDING WITH HYDROGEN ABSORBING INNER LINER

[75] Inventor: Mickey O. Marlowe, Fremont, Calif.

[73] Assignee: General Electric Company, San Jose, Calif.

[21] Appl. No.: 215,451

[22] Filed: Mar. 21, 1994

[51] Int. Cl.$^6$ .................................................. G21C 3/00
[52] U.S. Cl. ........................... 376/416; 376/417; 376/457
[58] Field of Search ................................ 376/416, 417, 376/457; 976/DIG. 44; 148/672, 519, 555, 634, 375, 675

[56] References Cited

U.S. PATENT DOCUMENTS

| | | | |
|---|---|---|---|
| 3,850,584 | 11/1974 | Bohm et al. | 29/194 |
| 4,530,719 | 7/1985 | Johnson et al. | 75/124 |
| 4,659,545 | 4/1987 | Ferrari | 376/457 |
| 4,986,957 | 1/1991 | Taylor | 376/417 |
| 5,223,211 | 6/1993 | Inagaki et al. | 376/462 |
| 5,301,218 | 4/1994 | Taylor, Jr. et al. | 376/417 |
| 5,310,431 | 5/1994 | Buck | 148/325 |
| 5,341,407 | 8/1994 | Rosenbaum et al. | 376/409 |

FOREIGN PATENT DOCUMENTS

| 1202985 | 10/1965 | Germany | 376/416 |
|---|---|---|---|

OTHER PUBLICATIONS

IAEA-TECDOC-684, "Corrosion of zirconium alloys in nuclear power plants", International Atomic Energy Agency, pp. 50–52, Jan. 1993.

Erickson, W. H. and Hardie, D., "The Influence of Alloying Elements on the Terminal Solubility of Hydrogen in alpha Zirconium," Journal of Nuclear Materials, 13, 1964, pp. 254–262.

Wilkins, B. J. S., Wasylyshyn, A. "Diffusion of Hydrogen Up a Thermal Gradient," Journal of Nuclear Materials, 29, 1969, pp. 235–237.

Tashiro, K., Abstract of report entitled "Enhanced Hydrogen Diffusion and Removal Techniques by Electromigration", Ontario Hydro Reports No. MIC–90–06098, 1990.

*Primary Examiner*—Donald P. Walsh
*Assistant Examiner*—Meena Chelliah
*Attorney, Agent, or Firm*—James E. McGinness; Jeffrey K. Weaver

[57] ABSTRACT

A cladding tube for use in holding fissionable material in a water cooled nuclear reactor is provided. The cladding tube includes inner and outer circumferential regions, and including (1) a substrate defining the outer circumferential region, and (2) an inner liner defining the inner circumferential region. The inner liner is made from a zirconium alloy having at least one alloying element which promotes hydrogen absorption in a concentration of between about 1 and 15 weight percent. The hydrogen absorption promoting element can be one of the following: nickel, chromium, iron, zinc, vanadium, gallium, yttrium, palladium, platinum, or aluminum.

15 Claims, 3 Drawing Sheets

NUCLEAR FUEL CLADDING WITH HYDROGEN ABSORBING INNER LINER

This invention relates to a cladding for fuel elements used in nuclear reactors. More particularly, the invention relates to a cladding having an inner liner with strong hydrogen absorbing properties.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube. Often the cladding will be composed of layers including a zirconium alloy substrate and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing excess moisture and hydrogen. The internal portions of the fuel rod are pressurized with helium to help conduct the heat from the fuel material to the cladding.

Zirconium and its alloys, under normal circumstances, are excellent nuclear fuel cladding material since they have low neutron absorption cross sections and, at temperatures below about 350° C., are strong, ductile, extremely stable and relatively nonreactive in the presence of demineralized water or stem. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

Zircaloy cladding defects may occur due to various causes including debris induced fretting and pellet-cladding interaction. In the first of these, debris lodges next to the cladding and vibrates or frets against the cladding wall under the influence of the passing coolant. Such vibration continues until the cladding wall is penetrated. Pellet-cladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking in the cladding.

To combat defects due to pellet-cladding interaction, some cladding includes pure zirconium or low alloy content zirconium barrier layers metallurgically bonded to the inner surface of the tubing. The pioneering work on barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson. Barrier layers have been found to effectively prevent damage to the cladding due to interaction with the pellet. However, if the cladding wall is compromised in some manner (e.g. perforated or split by debris fretting), and water enters the fuel rod interior, the barrier layer can be rapidly oxidized.

To protect the zirconium barrier from such oxidation should a cladding breach occur, a three layer structure may be employed. Such structures include a corrosion resistant inner liner bonded to the fuel side of the barrier. They are described in U.S. patent application Ser. No. 08/091,672 entitled METHOD FOR MAKING FUEL CLADDING HAVING ZIRCONIUM BARRIER LAYERS AND INNER LINERS and U.S. patent application Ser. No. 08/092,188 entitled INNER LINERS FOR FUEL CLADDING HAVING ZIRCONIUM BARRIER LAYERS, both of which were filed on Jul. 14, 1993, assigned to the assignee hereof, and incorporated herein by reference for all purposes. While such linings can protect against rapid oxidation, they may still be susceptible to "secondary defects" in the cladding at locations away from the primary defect (the primary defect being the initial breach in the cladding wall).

After a fuel element has suffered a primary breach, it can sometimes be used for some period of time in a reactor. However, it has been observed that "secondary defects" sometimes occur as a result of coolant entering through the primary breach. Such secondary defects are often much worse than the primary failures, and the secondary defects can allow release of large amounts of fission products and fuel material from erosion/corrosion of the fuel material. Post-mortem studies of fuel rods indicate that the secondary failures are often due to localized hydriding ($ZrH_2$) of the cladding.

When the fuel rod is initially breached, the coolant water enters the tube and flashes to steam. It is believed that, the zirconium or zirconium based alloy inner surface of the fuel cladding tube reacts with the steam which has entered the rod by the following corrosion reaction:

$$Zr+2H_2O \rightarrow ZrO_2+2[(p)H_2(abs)+(1-p)H_2(gas)] \qquad (1)$$

In this equation, $H_2$ (abs) is the portion of the corrosion generated hydrogen that is absorbed by the metal, $H_2$ (gas) is the portion which is released into the rod atmosphere, and "p" is the fraction of hydrogen picked up (absorbed) by the metal.

Normally, zirconium is covered by a thin protective oxide film that protects against hydride formation. When this oxide film is scratched or otherwise becomes defective, the protective zirconium oxide will reform over the bare zirconium surface. However, when a condition known as "oxygen starvation" occurs within the cladding interior, the oxide film may not form fast enough to prevent a hydride blister from forming.

As corrosion proceeds by the above reaction, an increasing amount of $H_2O$ in the gas phase is replaced with $H_2$. The ratio of $H_2$ to $H_2O$ in the gas phase increases with distance from the initial defect location as time progresses. This occurs because the hydrogen diffuses along the tight gap between the fuel and the cladding while the steam reacts with the zirconium in the cladding wall. At a point removed from the primary defect, the local gas phase $H_2/H_2O$ ratio eventually becomes sufficiently high (e.g., of the order of 1000/1) that oxygen starvation occurs and the inner surface of the cladding tube forms a local, massive zirconium hydride by direct reaction with the hydrogen in the gas phase.

The massive hydrides are sometimes referred to as "sunbursts" or hydride "blisters" because of a microscopic distribution of associated hydrides and the protrusion from the cladding inner surface which results from the larger volume associated with hydrides in comparison to zirconium metal or alloy. These massive hydrides regions are extremely brittle and prone to self-generated cracks. Thus, they can result in the catastrophic secondary defects described above if subjected to a stress, as due to power increase in the fuel rod.

It is apparent from the above that there exists a need for a cladding that resists formation of hydride defects in the event of a cladding breach.

SUMMARY OF THE INVENTION

The present invention provides a cladding tube having inner and outer circumferential regions, and including (1) a substrate defining the outer circumferential region, and (2) an inner liner defining the inner circumferential region. The inner liner is made from a hydrogen absorbing zirconium alloy having at least one alloying element which promotes hydrogen absorption in a concentration of between about 1 and 15 weight percent. Preferably, the alloying element promoting hydrogen absorption is one of the following: nickel, chromium, iron, zinc, vanadium, gallium, yttrium, palladium, platinum, aluminum, or a combination thereof.

The inner liner of the cladding absorbs hydrogen at the corrosion site as it is formed, thus reducing the amount of gaseous hydrogen evolved. Because there is less gaseous hydrogen (in comparison to conventional cladding), the risk of producing local regions of oxygen starvation and secondary defects is reduced.

A preferred cladding tube of this invention includes a compliant zirconium barrier layer in addition to the substrate and inner liner. The barrier layer includes an inner surface bonded to the inner liner and an outer surface bonded to the substrate. Preferably, the inner liner includes between about 1 and 5% nickel by weight. In an alternative preferred embodiment, the inner circumferential liner includes between about 1 and 5% iron by weight.

These and other features of the present invention will be presented in more detail in the following specification of the invention and the figures.

DESCRIPTION OF THE PREFERRED EMBODIMENTS

I. THE CLADDING TUBE STRUCTURE

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 1:
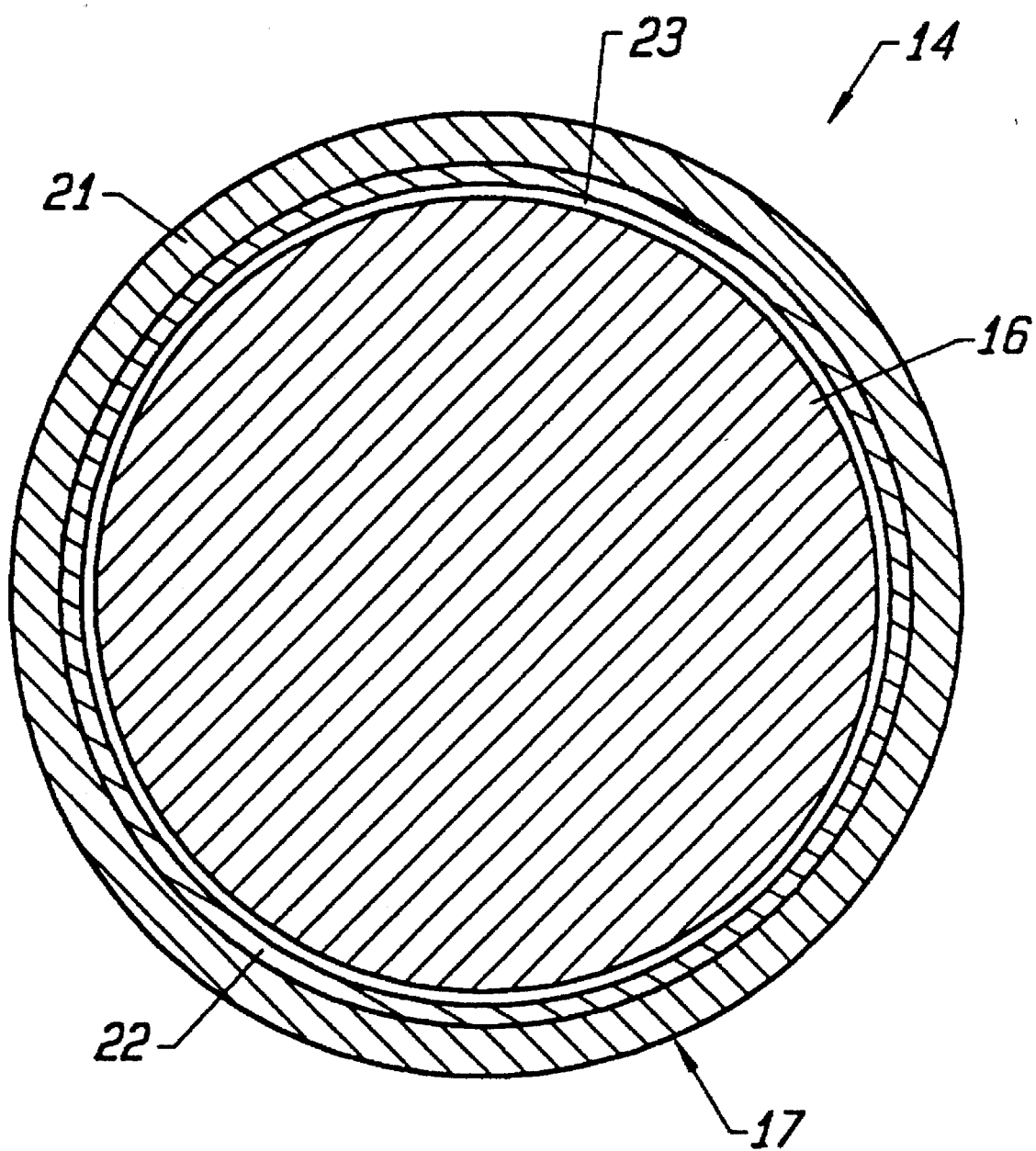
FIG. 1 is a cross sectional view of a nuclear fuel element of this invention having a substrate, a barrier layer, and an inner liner.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a substrate 21, a zirconium barrier 22, and an inner layer or liner 23. The substrate forms the outer circumferential region of a cladding tube, the inner liner forms an inner circumferential region, and the zirconium barrier is located between the substrate and inner liner. The inner liner is made from a material that is both corrosion resistant and strongly hydrogen absorbing, thereby keeping the gaseous hydrogen levels low in the tube interior and reducing the risk of local oxygen starvation pockets and secondary hydride defects in the cladding wall.

The substrate may be made from a conventional cladding material, i.e., a zirconium alloy. Suitable zirconium alloys for the substrate preferably include at least about 98% zirconium, up to about 0.25% iron, up to about 0.1% nickel, and up to about 1.7% tin (all percents by weight). Other alloying elements may include niobium, bismuth, molybdenum, as well as various other elements used in the art. Most generally, suitable zirconium alloys have (1) corrosion resistance to boiling water reactor ("BWR") and/or pressurized water reactor ("PWR") coolant and (2) sufficient strength and ductility for use as fuel elements. In a preferred embodiment of this invention, the substrate is Zircaloy-2 or Zircaloy-4. Other suitable materials are described in U.S. patent application Ser. No. 08/092,188, previously incorporated herein by reference.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to nodular corrosion while in pressurized water reactors (PWRs), larger precipitates generally provide superior resistance to generalized corrosion. In either environment, coarse precipitates provide improved resistance to axial crack propagation. In a preferred embodiment for BWRs, the substrate will have a dense distribution of fine precipitate (e.g., between about 0.01 and 0.15 micrometers in diameter) in the outer regions (radially) of the substrate and a less dense distribution of coarse precipitates (e.g., between about 0.2 and 1 micrometers in diameter) in the inner regions of the substrate. Detailed discussions of Zircaloy microstructure and methods of fabricating cladding having a desired microstructure are found in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

Metallurgically bonded on the inside surface of substrate 21 is the zirconium or dilute zirconium alloy barrier layer 22. See the above-mentioned U.S. Pat. Nos. 4,200,492 and 4,372,817 to Armijo and Coffin, U.S. Pat. No. 4,610,842 to Vannesjo, and U.S. Pat. No. 4,894,203 to Adamson. The barrier shields the substrate from the nuclear fuel material inside the composite cladding. In effect, the zirconium barrier deforms plastically to relieve pellet-induced stresses in the fuel element during swelling. The barrier also serves to inhibit stress corrosion cracking and protects the cladding from contact and reaction with impurities and fission products. In preferred embodiments, the thickness of the barrier layer is between about 50 and 200 micrometers (approximately 2 to 8 mils) and forms between about 5% to about 30% of the thickness or cross-section of the cladding.

Generally, the zirconium barrier layer may be made from unalloyed zirconium or a dilute alloy thereof possessing the desired structural properties. Suitable barrier layers are made from "low oxygen sponge" grade zirconium, "reactor grade sponge" zirconium, and higher purity "crystal bar zirconium". In alternative embodiments, the barrier layer is alloyed with low concentrations of alloying elements such as the chromium, nickel, and iron used in the substrate. The alloying elements and the concentrations at which they appear should be chosen to impart additional corrosion resistance to the barrier layer while maintaining compliance sufficient to prevent damage from pellet-cladding interaction.

Metallurgically bonded to the inside surface of the zirconium barrier 22 is the inner liner 23. As shown, the inner liner is the portion of the composite cladding closest to the nuclear fuel material 16. This layer protects the zirconium barrier from rapid oxidation should the fuel element interior come in contact with steam. In this invention, the inner liner also hinders formation of secondary defects caused by hydride blisters. Inner liners are described in detail in U.S. patent application Ser. No. 08/092,188, previously incorporated herein by reference.

Preferably, the inner liner should be a highly corrosion resistant material such as a zirconium alloy (e.g., a modified Zircaloy). The corrosion resistant inner liner will have a composition that strongly absorbs hydrogen gas and thereby reduces the danger of oxygen starvation. In a preferred embodiment, the inner liner contains about 80–99% zirconium and between about 1 and 15% of an element which promotes hydrogen absorption (the percents provided on a per weight basis). In more preferred embodiments, the concentration of alloying element promoting hydrogen absorption will be between about 1 and 5% by weight. Preferred alloying elements include nickel, chromium, iron, zinc, vanadium, gallium, yttrium, palladium, platinum, and aluminum, with nickel being especially preferred. In some embodiments, a combination of the above alloying elements may be provided. The concentration of any alloying element used will depend upon any detrimental effects that high concentrations of the alloying element can have on the cladding. For instance, some elements have high neutron absorption cross-sections and are therefore not used in greatly elevated concentrations. Other alloying elements such as yttrium have a low neutron absorption cross-section like zirconium. Such elements can be used in higher concentrations.

The hydrogen absorbing liner will take up some hydrogen as it is produced by the corrosion reaction (equation 1). This minimizes the partial pressure of hydrogen in the rod atmosphere by maximizing the so-called hydrogen pickup fraction, p. In the extreme case where all of the hydrogen produced by the corrosion reaction is absorbed, equation 1 reduces to the following form:

$$Zr + 2H_2O \rightarrow ZrO_2 + 2H_2(abs). \quad (2)$$

Cladding of the present invention, which immediately absorbs hydrogen at the corrosion site (rather than forming gaseous hydrogen), distributes the hydrogen as hydride relatively uniformly throughout the cladding tube inner surface. As noted, a problem in prior cladding was the locally high ratios of gaseous hydrogen to steam that allowed formation of damaging hydride blisters. While the uniform absorption of hydrogen in cladding of the present invention does not prevent formation of hydride (the absorbed hydrogen forms some zirconium hydride), the hydride that does form exists in a low concentration and therefore does not cause massive hydrides. Typically, the hydride formed from absorption exists at a concentration of about a few hundred parts per million (ppm). For comparison, the blisters resulting in secondary defects can have hydride concentrations in neighborhood of 20,000 ppm.

The description of the invention to this point has focused on three-layer cladding structures. However, the invention is not limited to such structures. The potential for hydride-induced secondary defects exists in one and two layer cladding as well. In an alternative embodiment, cladding of this invention includes only a substrate and a hydrogen absorbing layer on the fuel facing side of the substrate. In another alternative embodiment, cladding includes a substrate and a zirconium barrier layer having an inner (fuel facing) region containing 1–15% by weight of a hydrogen absorbing element incorporated therein. In still other embodiments, the hydrogen absorbing material is provided in relatively pure form (e.g., nickel or palladium metal) on the inner surface the zirconium cladding. Such layers may be formed by electroplating, chemical vapor deposition or other technique for depositing thin layers.

The cladding of this invention may have hydrogen absorbing layers of various thicknesses. For example, in a three layer structure, the hydrogen absorbing layer is usually relatively thin (e.g., between about 20 and 40 micrometers) to ensure that the zirconium barrier layer is effective in mitigating damage due to pellet-cladding interaction. However, in other cladding, particularly cladding without a barrier layer, the hydrogen absorbing layer may be much thicker. In fact, it can form all of the cladding except for a thin outer region of Zircaloy or other cladding material.

Figure 2:
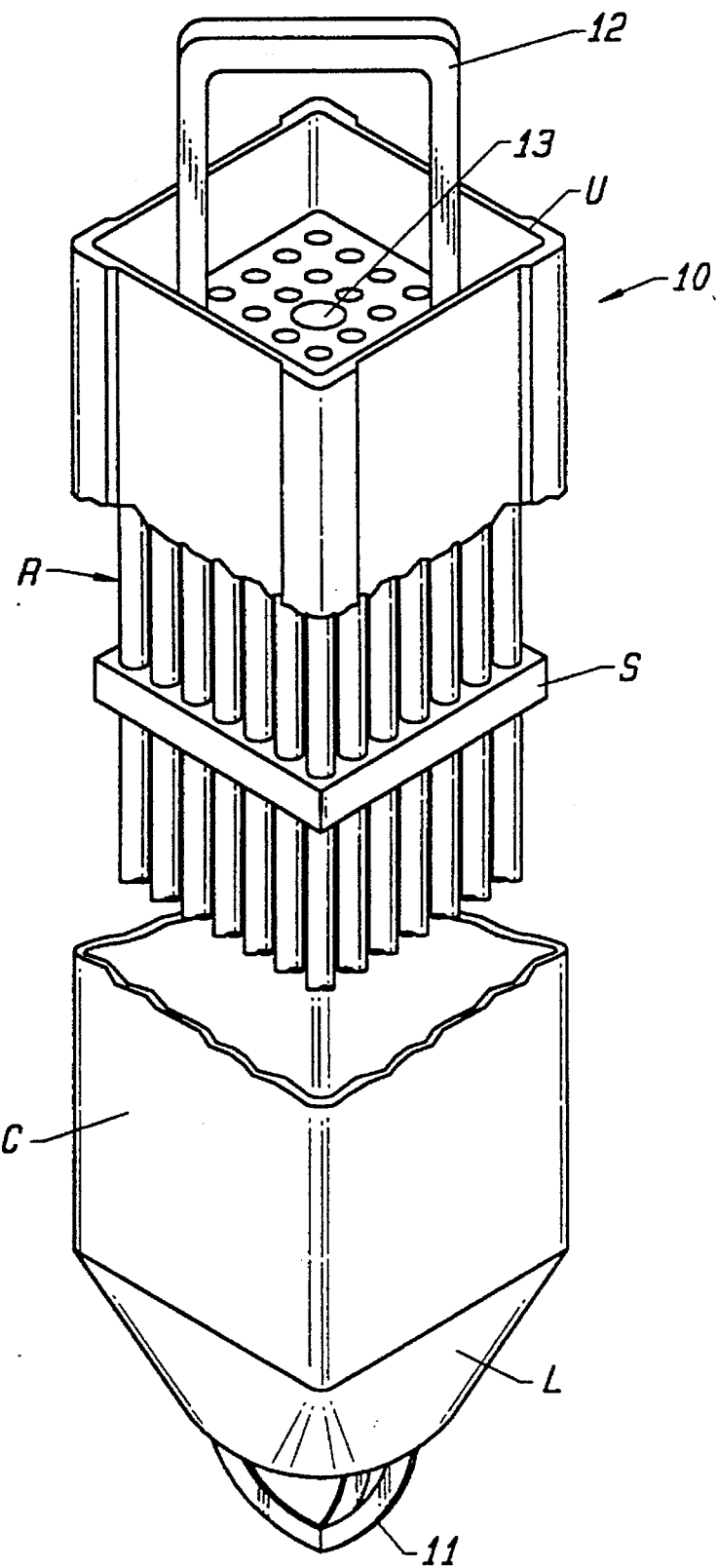
FIG. 2 is a partial cutaway perspective view of a nuclear fuel bundle containing a nuclear fuel rod.

Referring now to FIG. 2, a cutaway sectional view of a nuclear fuel bundle or assembly 10 for a BWR is shown. The fuel bundle is a discrete unit of fuel containing many individual sealed fuel elements or rods R each containing a cladding tube of this invention. In addition, the fuel bundle consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

The bundle shown in FIG. 2 is provided as an example only, and it should be understood that the present invention can also be employed in PWR and "CANDU" bundles. Although PWR nuclear fuel bundles are similar in some regards to the BWR fuel bundles, there are some important differences. For example, there are no channels in the PWR fuel bundles. Further, there are more fuel rods—as many as 17×17—in the bundle array. However, in other regards PWR and BWR bundles are similar. For instance, both have lifting bales and tie plates. The bundle arrangements employed in the "CANDU" reactors may also be used the present invention. CANDU reactors—which are used in some Canadian reactors employ natural uranium dioxide in horizontally oriented cladding tubes and use heavy water as the moderator.

Figure 3:
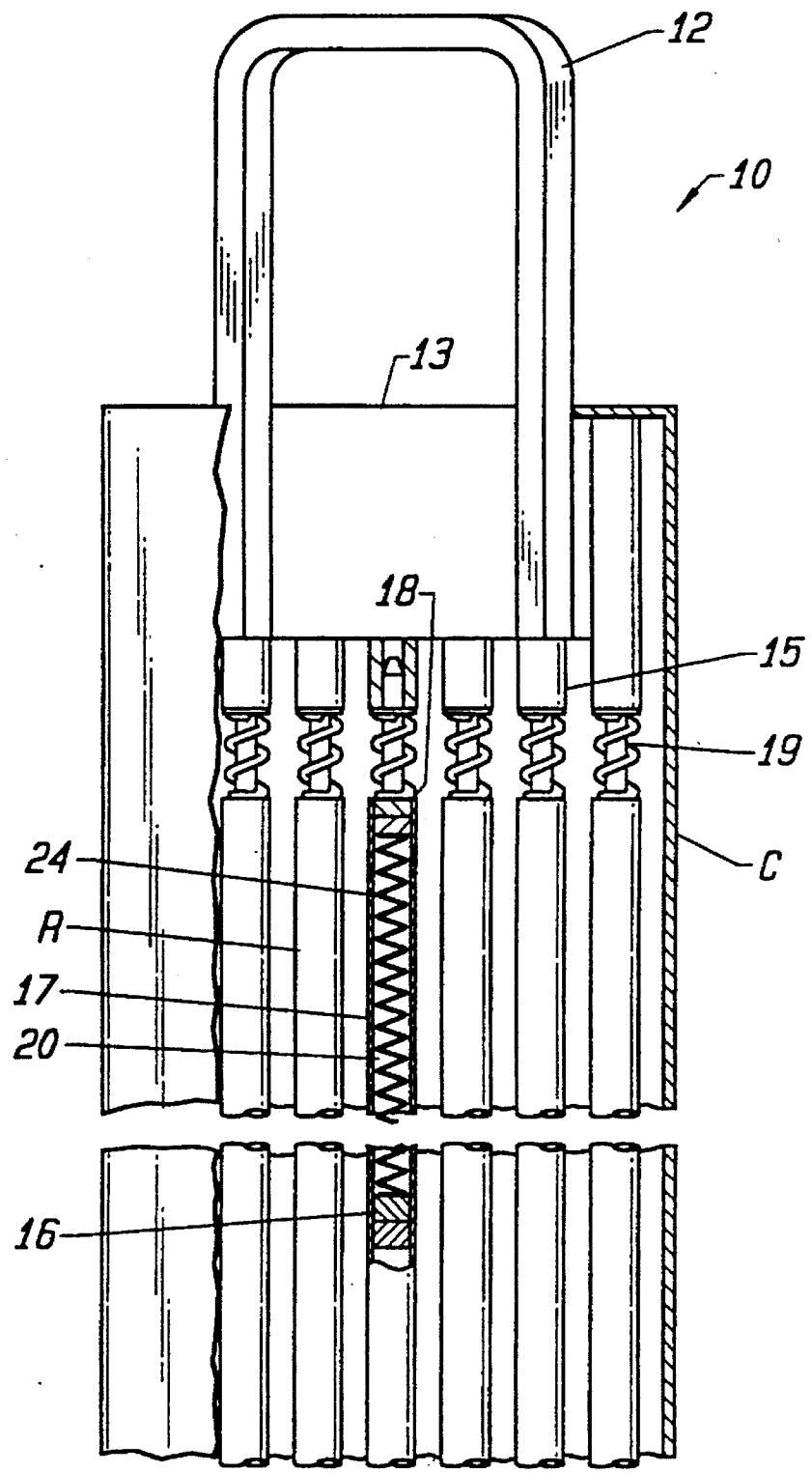
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A void space or plenum 20 is provided at one end of the element to permit longitudinal expansion of the fuel material 16 and accumulation of gases released by the fuel material. A getter (not shown) can be employed to remove hydrogenous impurities found in the fuel rod after manufacture. A nuclear fuel material retainer 24 in the form of a helical member is positioned within space 20 to provide restraint against axial movement of the pellet column during handling and transportation of the fuel element.

II. MANUFACTURE OF THE TUBING

Various methods can be used to fabricate the hydrogen-absorbing cladding tubes of this invention. Suitable methods should produce metallurgical bonds between the substrate and the zirconium barrier and between the zirconium barrier and the inner liner. Typically, the barrier and inner liner are provided as cylindrical tubes or sleeves that are bonded to the inside surface of a hollow zirconium alloy billet (which forms the substrate in the final cladding). Preferably, the components are bound to one another by coextrusion, but other methods may be employed. For example, the components can also be bonded to the billet by hot isostatic pressing or explosive bonding. In another method, the barrier and inner liner sleeves are bonded to the billet inner surface by heating (such as at 750° C. for 8 hours) to give diffusion bonding between the tubes and the billet. Prior to bonding (by, for example, extrusion), the barrier and inner liner sleeves preferably are joined to the billet at their ends by a bonding process such as electron beam welding in a high vacuum. Electron beam welding is a conventional process in which an electron beam is used to heat the ends of the cylindrical tubes until they fuse.

Extrusion is accomplished by putting the tube through a set of tapered dies under high pressure at about 1000° to 1400° F. (about 538° to 760° C.). Suitable extruders are available from Mannessmann Demang, Coreobolis, Pa. After extrusion, the composite is subjected to a conventional annealing and tube reduction processes to produce a product known as a "tubeshell" which is available in specified dimensions and compositions from various vendors such as Teledyne Wahchang (Albany, Oreg. USA), Western Zirconium (A Westinghouse company of Ogden, Utah), and Cezus (France).

To obtain the final tubing of the necessary dimensions, various manufacturing steps such as cold-working, heat treating, and annealing may be employed. The equipment and operating conditions necessary to carry out these various steps will be readily apparent to those of skill in the art, and are described in U.S. patent application Ser. No. 08/091,672 entitled METHOD FOR MAKING FUEL CLADDING HAVING ZIRCONIUM BARRIER LAYERS AND INNER LINERS, previously incorporated by reference. One suitable method of tube reduction involves three passes of about 65 to 80% cold work (conducted with a Pilger mill) followed in each case by a stress relief or recrystallization anneal.

A specific preferred process according to this invention is now described. It should be understood that although the conditions described in this example are quite specific, each step of the process could be conducted under a range of conditions. The process is started with a hollow Zircaloy billet of approximately six to ten inches in diameter and two feet in length. The billet will form the substrate of a structure by the end of the process. At that point, the billet will be converted to about 400 feet of tubing having about a one-half inch outer diameter.

First, the billet is rapidly quenched. Generally, the quench involves heating the billet above about 1000° C., and then rapidly cooling from 1000° C. to about 700° C. by immersion in a tank of water. Maintaining a proper quench rate is important in the temperature range between 1000° C. and 700° C.; after 700° C. is reached, however, the rate of cooling can be increased or decreased as desired.

After quenching, a tube of the metal selected to be the zirconium barrier and a tube of the material selected to be the corrosion-resistant, hydrogen-absorbing inner liner are concentrically inserted into the hollow billet. The ends of the billet, barrier, and inner liner tubes are then bonded by electron beam welding as described above. The welded tube is extruded at a tube temperature of about 570° C. to produce a tube having a diameter of about 3 inches. The extruded tube is further annealed and cold worked to produce a tubeshell of about 2.5 inches in diameter.

The tubeshell—which now has a zirconium barrier and inner liner bonded therein—is subjected to three or more cold work passes in a pilger mill. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

The first pass cold work step is typically performed to about 69%. This percent value is analogous to the percent reduction of the cross-sectional area of the tube. If the tube is given too much cold work in a single pass without stress relief, it will likely crack during manufacture. To relieve the stress caused by cold working, the tube is annealed at about 593° C. for two hours in a large vacuum annealing furnace such as is available from Centorr Vacuum Industries, located in Nashua, N.H.

Next, the tube is heat treated at about 927° C. on the outer 30% of the wall. This is accomplished by heating the tubeshell with a high-energy or frequency (from an induction coil) which penetrates about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes. This selective heating step imparts corrosion resistance to the outer region of the substrate by producing fine precipitates therein.

At this point, a second pass cold work is performed (this time to about 74%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils.

This tube is cut up into lengths for fuel rods (i.e. about 14 feet long) and given a final recrystallization anneal at 577° C. for about two hours. Alternatively, the final anneal could be a stress relief anneal conducted at any temperature between about 480° C. to 577° C. After the final anneal, the tube is ready for use in the reactor.

It will be recognized by those of skill in the art that various steps are performed in addition to those listed in the above. For example, chemical etching is employed to remove superficial defects caused by the tube reduction mill. Further, straightening of tubes is often performed with pieces of equipment designed for this purpose. In addition, various nondestructive tests such as corrosion tests and ultrasonic tests for crack imperfections in the surface are performed. This is not an exhaustive list, but merely serves to describe some steps which may be employed.

The composite tubing of this invention can be used to make nuclear fuel elements by first affixing a closure to one end of the cladding tube so that only one open end remains. The completed fuel element is then prepared by filling the cladding container with nuclear fuel material, inserting a nuclear fuel material retaining means into the cavity, evacuating the cladding tube interior, pressurizing the interior with helium, applying a closure to the open end of the container, and bonding the end of the cladding container to the closure to form a tight seal therebetween.

III. CONCLUSION

Although the foregoing invention has been described in some detail for purposes of clarity of understanding, it will be apparent that certain changes and modifications may be practiced within the scope of the appended claims. For instance, although the specification has described preferred zirconium alloy tubes, other shapes may be used as well. For example, plates and metal sections of other shapes may also be used. In addition, the reader will understand that the hydrogen-absorbing structure described herein can be used in reactor elements other than cladding. For example, the structure here taught may be used with tie rods, tie plates, spacer, etc. and their equivalent within the nuclear fuel bundle. Further, as the problem of local massive hydrides occurs in PWR, BWR, and CANDU heavy water moderated reactor environments, the cladding of the present invention can be employed in all of these systems.

What is claimed is:

1. A cladding tube for housing fissionable material in a water cooled nuclear fission reactor, the cladding comprising inner and outer circumferential regions, and including a substrate defining the outer circumferential region; and an inner liner defining the inner circumferential region, wherein the inner liner comprises a hydrogen absorbing zirconium alloy having one or more alloying elements which promotes hydrogen absorption in a concentration of between about 1 and 15 weight percent.

2. The cladding tube of claim 1 wherein the alloying element which promotes hydrogen absorption is selected from the group consisting of nickel, chromium, iron, zinc, vanadium, gallium, yttrium, palladium, platinum, aluminum, and combinations thereof.

3. The cladding tube of claim 2 wherein the inner liner comprises between about 1 and 5% nickel by weight.

4. The cladding tube of claim 2 wherein the inner liner comprises between about 1 and 5% iron by weight.

5. The cladding tube of claim 2 wherein the inner liner is between about 20 and 40 micrometers thick.

6. The cladding tube of claim 2 wherein the substrate comprises Zircaloy-2 or Zircaloy-4.

7. The cladding tube of claim 2 further comprising a zirconium barrier layer having inner and outer surfaces, the outer surface being bonded to the substrate and the inner surface being bonded to which the inner liner.

8. A fuel element comprising:

a cladding tube having inner and outer circumferential regions, and including a substrate defining the outer circumferential region, and an inner liner defining the inner circumferential region, wherein the inner liner comprises a zirconium alloy having an alloying element promoting hydrogen absorption in a concentration of between about 1 and 15 weight percent;

nuclear fuel material disposed within said tube; and means for sealing the respective ends of said tube with said nuclear material therein.

9. The fuel element of claim 8 wherein the alloying element promoting hydrogen absorption is selected from the group consisting of nickel, chromium, iron, zinc, vanadium, gallium, yttrium, palladium, platinum, aluminum, and combinations thereof.

10. The fuel element of claim 9 wherein the inner liner comprises between about 1 and 5% nickel by weight.

11. The fuel element of claim 9 wherein the inner liner comprises between about 1 and 5% iron by weight.

12. A cladding tube for housing fissionable material in a water cooled nuclear fission reactor, the cladding comprising inner and outer circumferential regions, and including a Zircaloy substrate defining the outer circumferential region and having an inner surface;

a compliant zirconium or dilute zirconium alloy barrier layer metallurgically bonded to the inner surface of the substrate and itself having an inner surface; and an inner liner metallurgically bonded to the inner surface of the barrier layer and defining the inner circumferential region, wherein the inner liner comprises a hydrogen absorbing zirconium alloy having one or more alloying elements which promotes hydrogen absorption in a concentration of between about 1 and 15 weight percent.

13. The cladding tube of claim 12 wherein the alloying element which promotes hydrogen absorption is selected from the group consisting of nickel, chromium, iron, zinc, vanadium, gallium, yttrium, palladium, platinum, aluminum, and combinations thereof.

14. The cladding tube of claim 13 wherein the inner liner comprises between about 1 and 5% nickel by weight.

15. The cladding tube of claim 12 wherein the barrier layer comprises a material selected from the group consisting of low oxygen sponge grade zirconium, reactor grade sponge zirconium, and crystal bar zirconium.

* * * * *